United States Patent
Jacob (Yaakov) et al.

(10) Patent No.: US 8,473,725 B2
(45) Date of Patent: Jun. 25, 2013

(54) SYSTEM AND METHOD FOR PROCESSING INTERRUPTS IN A COMPUTING SYSTEM

(75) Inventors: Jeffrey Allan (Alon) Jacob (Yaakov), Raanana (IL); Eitan Hai, Ramat Gan (IL)

(73) Assignee: Ceva D.S.P., Ltd., Herzlia Pituach (IL)

( * ) Notice: Subject to any disclaimer, the term of this patent is extended or adjusted under 35 U.S.C. 154(b) by 753 days.

(21) Appl. No.: 12/642,970

(22) Filed: Dec. 21, 2009

(65) Prior Publication Data
US 2011/0154001 A1    Jun. 23, 2011

(51) Int. Cl.
*G06F 7/38*    (2006.01)
*G06F 9/00*    (2006.01)
*G06F 9/44*    (2006.01)
*G06F 15/00*    (2006.01)

(52) U.S. Cl.
USPC ........................................................ 712/234

(58) Field of Classification Search
None
See application file for complete search history.

(56) References Cited

U.S. PATENT DOCUMENTS

| | | | |
|---|---|---|---|
| 5,774,709 A | * | 6/1998 | Worrell ......................... 712/233 |
| 5,815,696 A | * | 9/1998 | Tanaka et al. ................. 712/233 |
| 5,922,070 A | * | 7/1999 | Swoboda et al. ............. 712/244 |
| 6,055,628 A | | 4/2000 | Seshan et al. |

OTHER PUBLICATIONS

Guerra L et al. "Cycle and Phrase Accurate DSP Modeling and Integration for HW/SW Co-Verification" Design Automation, 1999 36th Annual Conference on New Orleans, LA US Jun. 21-25, 1999. pp. 964-969.
European Search Report for Application No. EP 10 19 6164 Dated Mar. 25, 2011.

* cited by examiner

*Primary Examiner* — Corey S Faherty
(74) *Attorney, Agent, or Firm* — Pearl Cohen Zedek Latzer, LLP (57) ABSTRACT

A system, processor and method are provided for digital signal processing. A processor may initiate processing a sequence of instructions followed by an interrupt. Each instruction may be processed in respective sequential pipeline slots. A branch detector may detect or determine if an instruction is a branch instruction, for example, in turn, for each sequential instruction. In one embodiment, the branch detector may detect if an instruction is a branch instruction until at least a first branch instruction is detected. A processor may annul instructions which are determined to be branch instructions when the interrupt occupies a delay slot associated with the branch instruction. An execution unit may execute at least the sequence of instructions to run a program. The branch detector and/or execution unit may be integral or separate from each other and from the processor.

17 Claims, 6 Drawing Sheets

| | 1 | 2 | 3 | 4 | 5 | 6 | 7 | 8 | 9 | 10 | 11 |
|---|---|---|---|---|---|---|---|---|---|---|---|
| | INSTRUCTION | PROGRAM ADDRESS | | | | | | | | | |
| 1 | A | 100 | IF1 | IF2 | D1 | D2 | D3 | E1 | E2 | E3 | E4 |
| 2 | IRQ | ******** | **** | **** | **** | **** | **** | **** | **** | **** | **** |
| 3 | A+1 | 101 | | IF1 | IF2 | D1 | KILLED | | | | |
| 4 | A+2 | 102 | | | IF1 | IF2 | KILLED | | | | |
| 5 | A+3 | 103 | | | | IF1 | KILLED | | | | |
| | INTERRUPT ADDRESS | | | | | | | | | | |
| 6 | IA+1 | 200 | | | | | IF1 | IF2 | D1 | D2 | D3 |
| 7 | IA+2 | 201 | | | | | | IF1 | IF2 | D1 | D2 |
| 8 | IA+3 | 202 | | | | | | | IF1 | IF2 | D1 |
| 9 | IA+3 | 203 | | | | | | | | IF1 | IF2 |
| 10 | IA+4 | 204 | | | | | | | | | IF1 |

FIG. 2

| | | 1 | 2 | 3 | 4 | 5 | 6 | 7 | 8 | 9 | 10 | 11 |
|---|---|---|---|---|---|---|---|---|---|---|---|---|
| | | INSTRUCTION | PROGRAM ADDRESS | | | | | | | | | |
| 1 | | A | 100 | IF1 | IF2 | D1 | D2 | D3 | E1 | E2 | E3 | E4 |
| 2 | | IRQ | ********** | **** | **** | **** | **** | **** | **** | **** | **** | **** |
| 3 | | A+1 | 101 | | IF1 | IF2 | D1 | D2 | D3 | E1 | E2 | E3 |
| 4 | | A+2=BRANCH | 102 | | | IF1 | IF2 | D1 | D2 KILLED | | | |
| 5 | | A+3 | 103 | | | | IF1 | IF2 | KILLED | | | |
| 6 | | INTERRUPT ADDRESS | 200 | | | | | IF1 | IF2 | D1 | D2 | D3 |
| 7 | | IA+1 | 201 | | | | | | IF1 | IF2 | D1 | D2 |
| 8 | | IA+2 | 202 | | | | | | | IF1 | IF2 | D1 |
| 9 | | IA+3 | 203 | | | | | | | | IF1 | IF2 |
| 10 | | IA+4 | 204 | | | | | | | | | IF1 |

FIG. 3

| | 1 | 2 | 3 | 4 | 5 | 6 | 7 | 8 | 9 | 10 | 11 |
|---|---|---|---|---|---|---|---|---|---|---|---|
| | INSTRUCTION | PROGRAM ADDRESS | | | | | | | | | |
| 1 | A | 100 | IF1 | IF2 | D1 | D2 | D3 | E1 | E2 | E3 | E4 |
| 2 | IRQ | ********** | **** | **** | **** | **** | **** | **** | **** | **** | **** |
| 3 | A+1 | 101 | | IF1 | IF2 | D1 | D2 | D3 | E1 | E2 | E3 |
| 4 | A+2 | 102 | | | IF1 | IF2 | D1 | D2 | D3 | E1 | E2 |
| 5 | A+3=BRANCH | 103 | | | | IF1 | IF2 | D1 | D2 KILLED | | |
| 6 | INTERRUPT ADDRESS | 200 | | | | | | IF1 | IF2 | D1 | D2 |
| 7 | IA+1 | 201 | | | | | | | IF1 | IF2 | D1 |
| 8 | IA+2 | 202 | | | | | | | | IF1 | IF2 |
| 9 | IA+3 | 203 | | | | | | | | | IF1 |
| 10 | IA+4 | 204 | | | | | | | | | |

FIG. 4

| | 1 | 2 | 3 | 4 | 5 | 6 | 7 | 8 | 9 | 10 | 11 |
|---|---|---|---|---|---|---|---|---|---|---|---|
| | INSTRUCTION | PROGRAM ADDRESS | | | | | | | | | |
| 1 | A | 100 | IF1 | IF2 | D1 | D2 | D3 | E1 | E2 | E3 | E4 |
| 2 | IRQ | ******** | **** | **** | **** | **** | **** | **** | **** | **** | **** |
| 3 | A+1 | 101 | | IF1 | IF2 | D1 | D2 | D3 | E1 | E2 | E3 |
| 4 | A+2 | 102 | | | IF1 | IF2 | D1 | D2 | D3 | E1 | E2 |
| 5 | A+3 | 103 | | | | IF1 | IF2 | D1 | D2 | D3 | E1 |
| | | INTERRUPT ADDRESS | | | | | | | | | |
| 6 | IA+1 | 200 | | | | | IF1 | IF2 | D1 | D2 | D3 |
| 7 | IA+2 | 201 | | | | | | IF1 | IF2 | D1 | D2 |
| 8 | IA+3 | 202 | | | | | | | IF1 | IF2 | D1 |
| 9 | IA+4 | 203 | | | | | | | | IF1 | IF2 |
| 10 | | 204 | | | | | | | | | IF1 |

SYSTEM AND METHOD FOR PROCESSING INTERRUPTS IN A COMPUTING SYSTEM

BACKGROUND

Embodiments of the invention relate to methods and systems for processing interrupts in a computing system. In particular, embodiments of present invention relate to reducing the computational penalty associated with processing interrupts.

An interrupt is an event that alters the sequence in which a processor executes instructions An interrupt unit may interrupt a current process executing a sequence of instructions to execute one or more higher-priority instructions. Once the interrupt sub-routine is processed, the processor may return from the interrupt sub-routine and resume processing the initial sequence of instructions.

The sequence of instructions may include a branch instruction. A branch instruction may cause a process to proceed in one of multiple possible ways, e g , based on a branch condition. For example, in a sequence of instructions, 1, 2, 3, 4, 5, where 5 is a branch instruction, instruction 5 may cause the process to proceed sequentially to instructions 6, 7, 8, . . . or to jump to instructions 100, 101, 102, . . . The instruction following the branch instruction, e.g., 6 or 100, may be unknown until the branch instruction is executed.

A branch predictor may be used to predict the outcome of a conditional branch. The predicted instructions at the branch may be preemptively retrieved from program memory and temporarily stored in a program cache for easy access. The branch prediction may be correct or incorrect. The branch predictor may resolve the branch outcome and determine if the branch prediction is correct or incorrect over one or more subsequent computational cycles. When an interrupt occurs during the computational cycles used to resolve the branch, the branch outcome is unknown and must be re-computed.

A branch instruction may be associated with one or more subsequent delay slots When an interrupt is accepted following a branch instruction, the interrupt may be processed in one of the delay slots. The branch condition to determine if the prediction is correct or not may be computed during the same computational cycles in which the delay slots are processed. Therefore, when an interrupt occurs during a delay slot of a branch instruction and is processed by replacing the delay slot, the outcome of the branch condition computation may be unknown. Accordingly, branch instructions and instruction processed in the associated delay slots cannot be properly executed and must be re-processed after the interrupt is handled and the initial instructions resume.

Typically it is not known if an instruction is a branch instruction until the instruction has been decoded, e.g., after processing the instructions for several computational cycles In current systems, instructions which are not yet decoded are indiscriminately discarded prior to decoding, just in case, but before it is known if, the instructions are branch instructions. The additional computational cycles used to re-process the discarded data may be referred to as an interrupt penalty. Accordingly, an interrupt penalty is always incurred when processing an interrupt.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention, However, it will also be apparent to one skilled in the art that the present invention may be practiced without the specific details presented herein Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

An interrupt may refer to an event indicating the need for a change in execution. An interrupt may occupy a processor pipeline slot, which would otherwise be allocated to another instruction in the process. An interrupt may be processed in an interrupt sub-routine including one or more instructions that are processed in respective sequential pipeline slots, e.g., over multiple computational cycles or pipeline stages. After processing an interrupt sub-routine, the processor may resume processing instructions which were partially processed or queued at the time of the interrupt. When an instruction is discarded, annulled, or "killed," after returning from the interrupt sub-routine, the instruction may be fetched and processed again, thereby incurring an interrupt penalty.

A branch instruction may refer to an instruction at which a process may proceed in one of multiple possible ways. A branch predictor may be used to predict and preemptively retrieve the most likely subsequent instruction. When the prediction is correct, the predicted instruction may be processed, or, in the case that the branch prediction is incorrect, the processor may stall while the correct non-predicted instruction is retrieved from program memory. A branch instruction may be processed in a processor pipeline slot followed by a plurality (e.g., three) delay slots, which are used to process subsequent instructions that have been retrieved and are available in the processor pipeline.

When the first instruction in the interrupt sub-routine is executed in one of the branch's delay slots, the processor may not retain the correct sequence of instructions to execute after processing the interrupt This is complicated by the branch prediction and whether the branch prediction is correct or incorrect. Since the delay slots may be needed to properly process the branch, when the interrupt occurs during one of the delay slots, the branch delay slot instructions and branch predictions may be re-processed in a pipeline slot following the interrupt sub-routine.

In contrast, a non-branch instruction may be processed and resolved independently in a single pipeline slot, e.g., without subsequent delay slots. Thus, when an interrupt is executed following a non-branch instruction, the interrupt typically does not affect the instruction process.

However, it may not be immediately evident which instructions are branch instructions and which are not. Determining if an instruction is a branch instruction may require several computational cycles of processing. In one example, an instruction may be decoded to determine if it is a branch instruction.

In conventional systems, for preventative assurance, instructions are indiscriminately discarded when it has not yet been determined if the instructions are branch instruction, e g , partially processed instructions which have not yet been decoded. Accordingly, in conventional systems, there is an interrupt penalty for re-processing and re-retrieving partially processed instructions preceding an interrupt regardless of whether or not the instructions do actually include a branch instruction.

According to embodiments of the invention, when an interrupt is executed following a sequence of instructions, the instructions are not stopped, interrupted, or discarded, and may be processed until a branch instruction is actually detected. The instructions preceding the interrupt may be processed at least until it is determined whether or not the instructions include a branch instruction e.g., in the decode stage. If the instructions include a branch instruction, as in conventional systems, the branch instruction and the branch delay slots, if any, may be discarded, thereby incurring an interrupt penalty for the discarded instructions However, in contrast with conventional systems, any instructions that do not include a branch instruction may continue to be processed. Accordingly, non-branch instructions may incur no computational penalty when they are succeeded by an interrupt event.

Figures 1A, 1B:
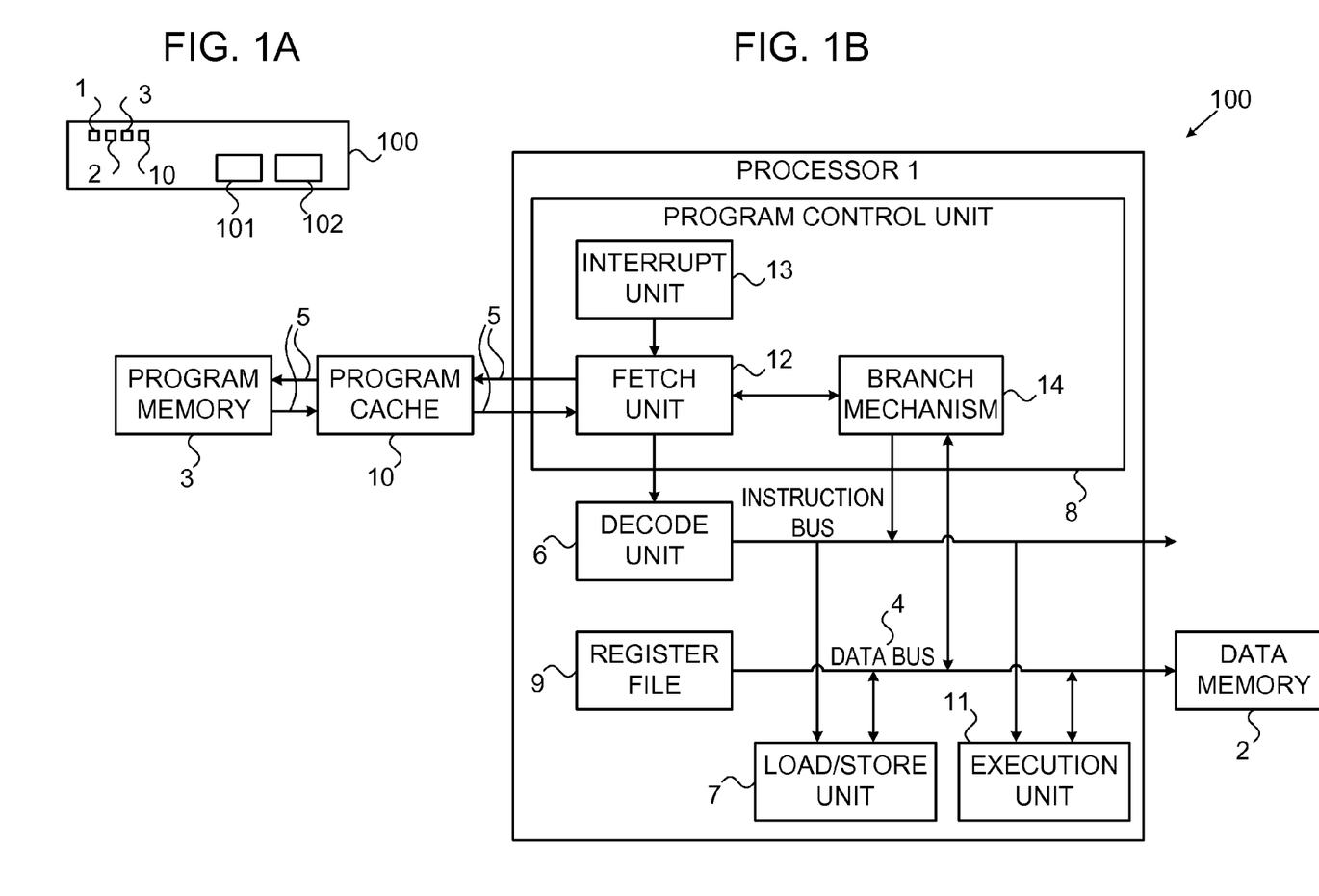
FIG. 1A is a schematic illustration of a system in accordance with embodiments of the invention.
FIG. 1B is a close-up view of some components of the system of FIG. 1A in accordance with embodiments of the invention.

Reference is made to FIGS. 1A and 1B, which are schematic illustrations of a standard and close-up view of a system according to embodiments of the invention. The system may include a device 100 having a processor 1, a data memory unit 2, a program memory unit 3, and a program cache 10.

Device 100 may include a computer device, cellular device, or any other digital device such as a cellular telephone, personal digital assistant (PDA), video game console, etc Device 100 may include any device capable of executing a series of instructions to run a computer program. Device 100 may include an input device 101 for receiving input from a user (e.g., via a pointing device, click-wheel or mouse, keys, touch screen, recorder/microphone using voice recognition, other input components). Device 100 may include an output device 102 (e.g., a monitor or screen) for displaying a program on a user interface according to a sequence of instructions executed by a processor 1.

Processor 1 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Processor 1 may be coupled to data memory unit 2 via a data bus 4 and to program memory unit 3 via a program memory bus 5.

Program memory unit 3 typically stores a set of instructions and rules for running a computer program while data memory unit 2 typically stores data generated while operating the program instructions such as pre-generated (i.e. static) data and/or scratch pad (i e. dynamic) data; however, other arrangements for storing instructions and data in a memory or memories may be used.

Program cache 10 may provide temporary storage for program instructions retrieved from program memory unit 3 so that the instructions are more accessible for use by program control unit 8. Program memory unit 3 may be a long term memory unit, while program cache 10 may be a short term memory unit. Data memory unit 2, program memory unit 3 and program cache 10 may include, for example, static random access memory (SRAM), dynamic RAM (DRAM), flash memory, or other suitable memory units or storage units, and may use volatile memory or non-volatile memory. Data memory unit 2, program memory unit 3, and program cache 10 may be implemented as separate or integrated memory units Data memory unit 2, program cache 10 and/or program memory unit 3 may be integrated ("on-chip") or may be separate (i.e., "off-chip") In one embodiment in which there is a multi-level memory or a memory hierarchy, program memory unit 3 may be off-chip and the program cache 10 and/or Data memory unit 2 may be on-chip, e.g., an L-1 cache (e.g., which is relatively more integrated with processor 1 than an L-2 cache and typically runs at the clock rate of processor 1) or an L-2 cache (e.g., which is relatively less integrated than the L-1 cache and typically runs at a different rate than the clock rate of processor 1). Other or additional memory architectures may be used.

Processor 1 may include a program control unit 8 Program control unit 8 may request, retrieve, and dispatch instructions from program memory unit 3 and may be responsible, in general, for the program pipeline flow. Program control unit 8 may include a data memory controller (not shown) coupled to data memory bus 4, and a program memory controller (not shown) coupled to program memory bus 5 to retrieve data from data memory unit 2 and program memory unit 3, respectively.

Program control unit 8 may include a fetch unit 12, an interrupt unit 13, and a branch mechanism 14. Fetch unit 12 may be used to fetch instructions to a local queue prior to dispatching the instructions. Branch mechanism 14 may detect branch instructions, predict the outcome of branch instructions, and based on the predicted outcome of branch instructions, e.g., when there is a branch mis-prediction, request subsequent instructions from program memory unit 3 via fetch unit 12. Interrupt unit 13 may retrieve and handle interrupt events. The interrupt signals may have associated priority level(s) In some instances, interrupt unit 13 may mask, postpone, or disable incoming interrupts, e.g., while processor 1 executes high priority, bundles, or sequences of instructions, e.g., an instruction loop. If enabled, interrupt unit 13 may interrupt a current process, e.g., to initiate another higher priority process.

Processor 1 may include a decode unit 6, a load/store unit 7, one or more register files 9, and an execution unit 11 Once instructions are dispatched by program control unit 8, decode unit 6 may decode the instructions Processor 1 may use register files 9 to implement tags to efficiently access decoded instruction, e.g., in the same computational cycle as they are requested. Execution unit 11 may execute the instructions Load/store unit 7 may perform load and store operations from/to data memory unit 2.

Processor 1 may execute, for example, the following sequential pipeline stages for each instruction:
- IF1—program memory address (operated by program control unit 8)
- IF2—program memory fetch (operated by fetch unit 12)
- D1—instruction dispatch (operated by program control unit 8)
- D2—instruction decode (operated by decode unit 6)
- D3 to D4—register file read (using register files 9)
- E1 to E4—execute, data memory access, and register file write-back (operated by execution unit 11, load/store unit 7, and register files 9)

It should be understood to a person skilled in the art, however, that embodiments of the invention are not limited to any specific sequence and other or additional pipeline stages and operating device components may be used.

In a process comprising sequential instructions, instructions to be processed in future are known beforehand and fetch unit 12 may preemptively retrieve instructions so that each instruction is fetched before the processor is ready to dispatch the instruction. The fetched instructions are temporarily stored in program cache memory 10, and/or a local queue which is significantly faster to access than program memory 3.

However, instructions succeeding a conditional branch instruction may depend on a branch condition that is not yet known at the time the instructions are to be fetched. For example, the branch instruction may proceed to any of multiple different instructions or process paths depending on the outcome of the branch condition.

Branch mechanism 14 may identify whether or not an instruction is a branch instruction, for example, at the decode stage (D2) of processing the instruction.

When an instruction is a branch instruction, if the correct one of multiple possible subsequent instructions is not known at the time when the instruction is to be retrieved, branch mechanism 14 may predict which instruction(s) most likely succeeds the branch instruction. The predicted instruction(s) are retrieved from program memory 3 and, if the prediction is correct, the predicted instructions are processed after executing the branch delay slots.

Processor 1 may determine the branch condition and therefore, if the predicted instruction(s) matches the actual branch outcome, for example, at the execution stage (E1) This determination may take a number of cycles (e.g., three).

If the predicted branch instruction(s) matches the actual branch outcome, the predicted instruction(s) are correct and may be used.

However, if the predicted branch instruction(s) do not match the actual branch outcome, the actual branch instruction may be fetched from program memory 3 and an additional computational penalty of for example, 3 cycles (IF1 to D1) may be incurred for fetching the correct instruction from program memory 3. This penalty may vary for different pipelines of processor 1.

When an interrupt is processed during any of the delay slots or computational cycles following a branch instruction slot, processor 1 may not retain the correct sequence of instructions to properly process the branch after the interrupt slot. Accordingly, the branch instruction and any instructions processed in the delay slots associated therewith may be discarded The program address of the first discarded or annulled instruction may be written to a return register (e.g., in register files 9) and may be re-processed in a pipeline slot after returning from the interrupt sub-routine.

However, when an instruction is not a branch instruction, the sequence of subsequent instructions is already known at the time of the interrupt. Accordingly, non-branch instructions followed by an interrupt are not stopped, interrupted, or discarded, and may be processed until completion through the pipeline of processor 1.

According to embodiments of the invention, when an interrupt follows instructions which are already in the processor pipeline, the instructions are processed at least until it is determined whether or not they are branch instructions, e.g., in the D2 stage. Since branch instructions having interrupts in subsequent delay slots may not properly resolve the branch outcome, when processor 1 determines that one or more instructions(s) are branch instructions and that the interrupt occupies one or more of the associated delay slots, the branch instruction, the branch delay slots, and the predicted instructions associated therewith are discarded or annulled. An interrupt penalty is incurred to re-process the discarded data after the interrupt is handled. However, when processor 1 determines that the instructions(s) are non-branch instructions, which are processed alone in a single pipeline slot, the non-branch instructions are allowed to proceed uninterrupted until completion. In this case, no data is discarded and no interrupt penalty is incurred.

Embodiments of the invention provide an advantage over conventional systems, in which, when an interrupt follows instructions for which it is not known if the instructions are or are not branch instructions, (e.g., before the instructions are decoded in the D2 pipeline stage), the instructions are simply discarded and an interrupt penalty is always incurred for re-processing the instructions.

Reference is made to FIGS. 2-5, which are tables showing processor operations for handling an interrupt. In FIGS. 2-5, each row in the tables represents a single instruction in a separate pipeline slot. The instructions (listed in column 1) are ordered in sequential rows or slots in the order in which they may be processed, i.e., in the order in which the instructions first enter the processor pipeline slot (in pipeline stage IF1). Each sequential column shows the pipeline stage or operation executed on the instructions that occur in each sequential computational cycle. That is, once an instruction in each row first enters the processor pipeline slot, in each sequential column, the processor may execute sequential stages of operations on the instruction, e.g., program memory address (IF1), fetching (IF2), dispatching (D1), decoding (D2), register file read (D3 to D4), execute, data memory access, and register file write-back (E1 to E4). However, when an interrupt is processed in a pipeline slot, the processor may annul or "kill" instructions in preceding pipeline slots before they are processed to completion (e g , in pipeline stage E4). Other or additional operations may be used.

Figure 2:
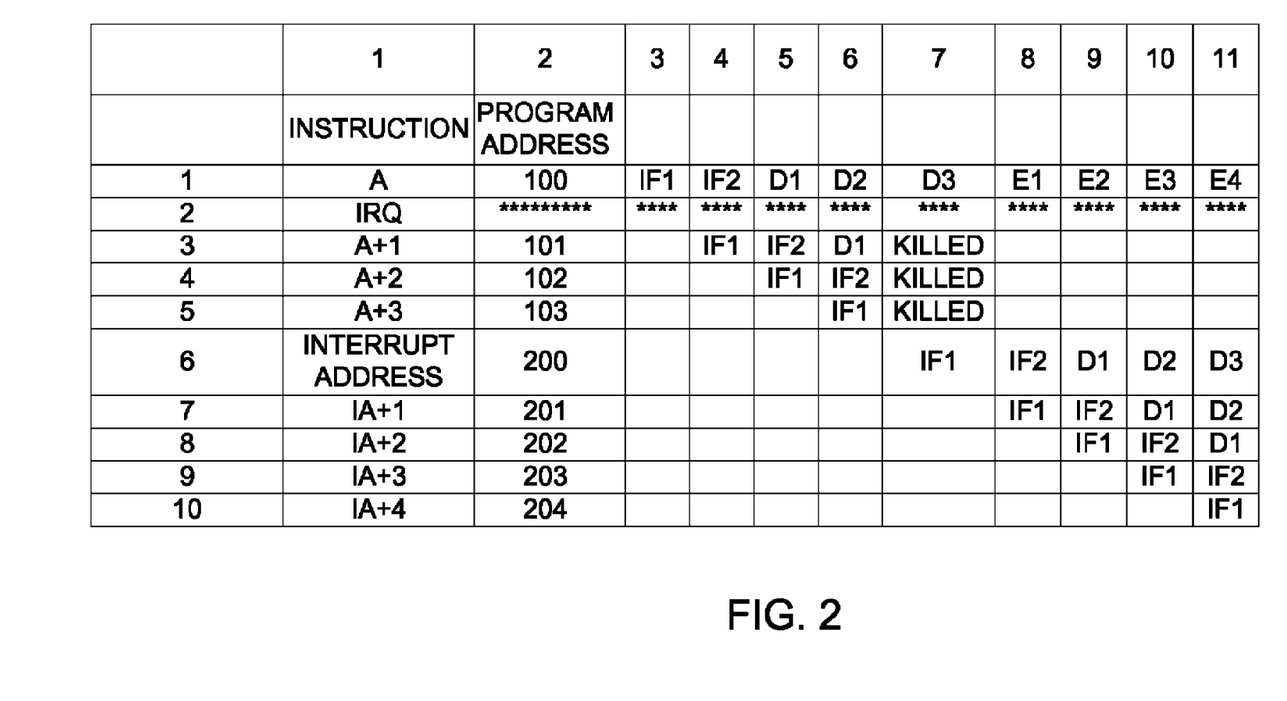
FIG. 2 is a table showing processor operations for handling an interrupt in a conventional system.

FIG. 2 shows processor operations for handling an interrupt in a conventional system.

The upper-left cell (row 1, column 1) in the table shows an instruction labeled "A " The instruction A may be an instruction in a sequence of instructions of a program, e.g., A, A+1, A+2, A+3, (rows 1 and 3-5, column 1). Instruction A may be stored at a first address, e.g., denoted arbitrarily to be address 100 (row 1, column 2) and subsequent instructions A+1, A+2, A+3, . . . , may be stored at different sequential addresses, e.g., denoted arbitrarily to be 101, 102, 103, (rows 3-5, column 2).

During the program process, instruction A may enter the processor pipeline, e.g., in pipeline stage IF1 (row 1, column 3) In pipeline stage IF1, a processor (e.g., processor 1 of FIGS. 1A and 1B) may access a program memory address to locate instruction A stored at address 100 in a program memory (e.g., program memory 3 of FIGS. 1A and 1B) Instruction A may proceed to the next sequential stages IF2 (row 1, column 4), D1 (row 1, column 5), and then D2 (row 1, column 6).

In pipeline stage D2 (row 1, column 6), the processor may decode instruction A to determine if instruction A is a branch instruction, In this example case, instruction A is not a branch instruction and the instruction may proceed through the processor pipeline until it is completely processed.

In the next computational cycle (the operations of column 7), an interrupt event or "interrupt request" (IRQ) (row 2, column 1) at an interrupt address 200 (row 6, column 1) may be detected by the processor. The interrupt may have a priority higher than the current task being executed by the processor and hence the interrupt is not masked. Handling the interrupt requires fetching the interrupt address, e g in pipeline stage IF 1 (row 6, column 7). The processor may access program memory address 200 (row 6, column 2) in pipeline stage IF1 to locate the interrupt.

When the interrupt is first processed (e.g., in stage IF1: row 6, column 7), instructions A+1, A+2, and A+3, have been dispatched (D1: row 3, column 6), fetched (IF2: row 4, column 6) and addressed (IF1: row 5, column 6), respectively, (row 6, column 7) but none of the instructions A+1, A+2, and A+3 have been decoded (D2). Since the processor determines if instructions are branch instructions in the decode stage (D2), it is not known at the time when the interrupt is initially processed whether or not instructions A+1, A+2, and A+3 are branch instructions. If instructions A+1, A+2, and A+3 are branch instructions, the interrupt will occupy a delay slot needed to properly process the branch instruction. According to conventional methods, instructions A+1, A+2, and A+3, which are interrupted before it is determined if they are branch instructions, are simply annulled, discarded, or "killed" (rows 3-5, column 7).

A return register (e.g., in register files 9 of FIG. 1B) may be loaded with the address of the first in the sequence of annulled instructions, e.g., instruction A+1. The first annulled instructions may be written to the reload register address 101 as instruction A+1. After returning from or completing the interrupt sub-routine, the processor may resume processing and executing the annulled instructions in the next available slot in the processor pipeline.

The process incurs a computational penalty for repeating operations already executed on the annulled instructions. For example, the operations which were already executed on instructions A+1, A+2, A+3 prior to the interrupt (in columns 4, 5, and 6) are executed again on the instructions after returning from the interrupt sub-routine. The interrupt penalty in this case is three computational cycles.

Figure 3:
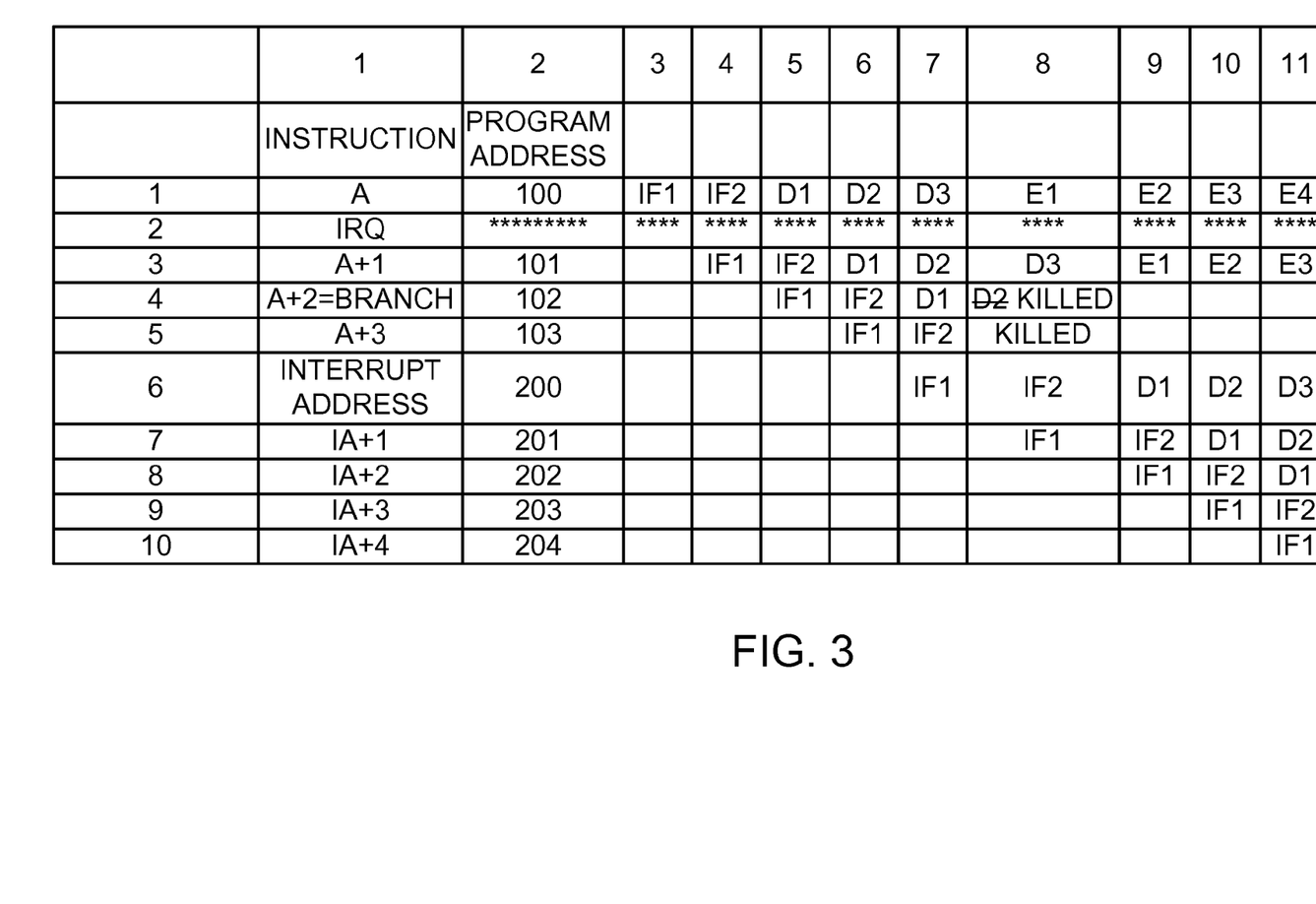
FIGS. 3-5 are tables showing processor operations for handling an interrupt in accordance with embodiments of the invention.
Figure 4:
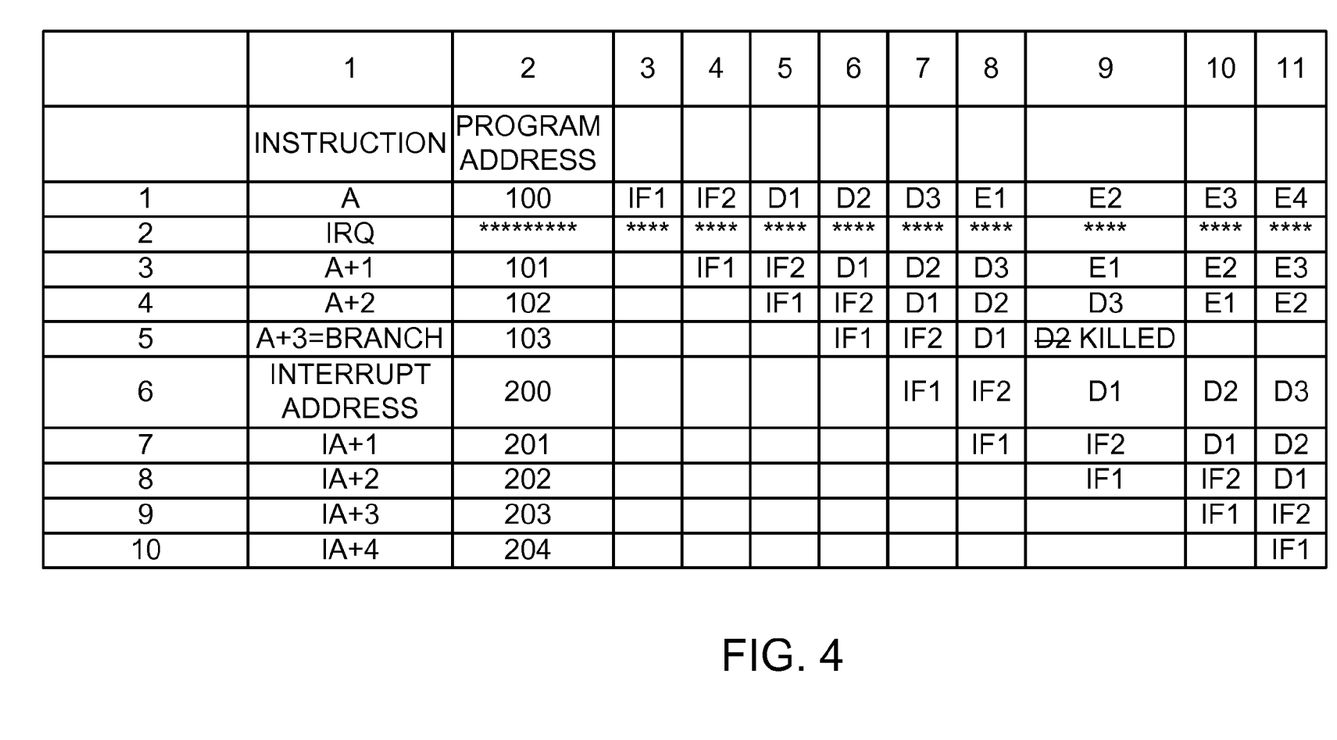
Figure 5:
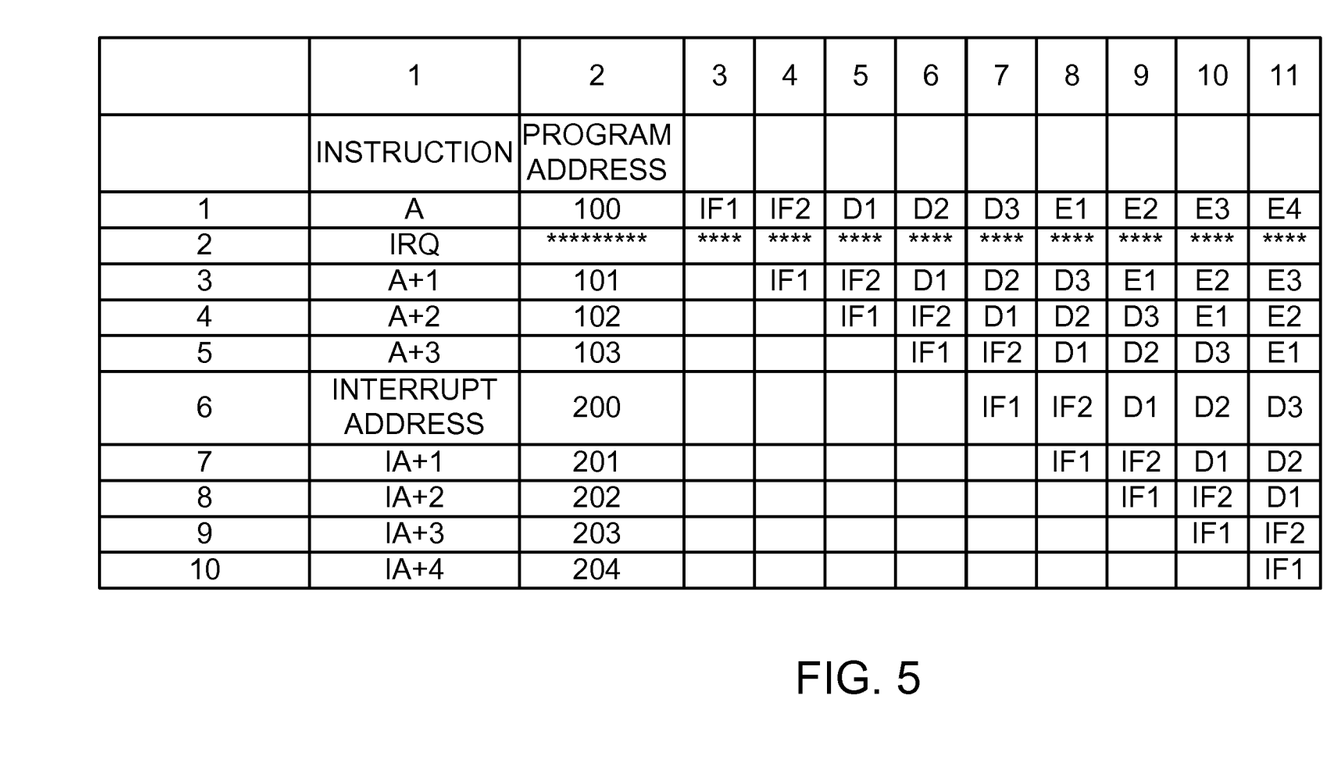

FIGS. 3-5 show processor operations for handling an interrupt according to embodiments of the invention. The operations of FIGS. 3-5 may be executed, for example, by device 100 of FIGS. 1A and 1B.

FIGS. 3-5 show the same interruption described in reference to FIG. 2, such that when the interrupt is first processed (row 6, column 7), instructions A+1, A+2, and A+3 have not yet been decoded and it is therefore not known if the instructions are branch instructions. However, in contrast with FIG. 2, and according to embodiments of the invention, in FIGS. 3-5, the instructions A+1, A+2, and A+3 are not annulled when the interrupt is first processed, but are processed at least until one of them is determined to be a branch instruction., When one of instructions A+1, A+2, and A+3 is determined to be a branch instruction and an interrupt occupies at least one of the delay slots necessary to resolve the branch, the branch instruction itself and any instructions in pipeline slots between the branch instruction slot and the interrupt slot may be annulled or "killed." If no branch instructions are detected, as in FIG. 5, the instructions are processed without annulment and there is no interrupt penalty.

In FIG. 3, a processor (e g., processor 1 of FIGS. 1A and 1B) decodes instruction A+1 (row 3, column 7) and determines that it is not a branch instruction. Accordingly, instruction A+1 is not annulled and is processed uninterrupted until completion (e.g., in stage E4: row 3, column 11—not shown) The processor decodes instruction A+2 (row 4, column 8) and determines that the instruction is a branch instruction Branch instruction A+2 typically requires a plurality (e.g., three) subsequent delay slots to be properly processed. Interrupt occupies at least one of the delay slots needed to properly process branch instruction A+2 (e.g., the second of the three delay slots). Accordingly, branch instruction A+2 cannot be properly processed, and branch instruction A+2 and instruction A+3, e.g., occupying a single delay slot insufficient to resolve the branch, are annulled or "killed" (rows 4 and 5, column 8, respectively).

A return register (e.g., in register files 9 of FIG. 1B) may be loaded with the address of the first in the sequence of annulled instructions, e.g., instruction A+2. The first annulled instructions may be written to the reload register address 101 as instruction A+1. After returning from or completing the interrupt sub-routine, the processor may resume processing and executing the annulled instructions in the next available slot in the processor pipeline.

In this case, an interrupt penalty is incurred for repeating the operations which were executed on annulled instructions A+2 and A+3 prior to the interrupt (in columns 5 and 6) again for the instructions after returning from the interrupt routine. The interrupt penalty incurred in this case using embodiments of the invention is two computational cycles, reduced from three computational cycles incurred for the same interruption using the conventional mechanisms described in reference to FIG. 2.

FIG. 4 shows the same interruption described in reference to FIG. 3, except that instruction A+3, not A+2, is a branch instruction.

A processor (e.g., processor 1 of FIGS. 1A and 1B) may decode instructions A+1 and A+2 (row 3, column 7 and row 4, column 8, respectively) and determine that instructions A+1 and A+2 are not branch instructions. Accordingly, instructions A+1 and A+2 are allowed to proceed uninterrupted until the instructions are completely processed (e.g., in stage E4: row 3, column 11 and row 4, column 12, respectively, both not shown). The processor may then decode instruction A+3 (row 5, column 9) and determine that the instruction is a branch instruction. Since the interrupt occupied the delay slots succeeding instruction A+3, e.g., needed to properly process the branch instruction A+3, instruction A+3 is annulled or "killed" (row 5, column 9).

A return register (e.g., in register files 9 of FIG. 1B) may be loaded with the address of the first in the sequence of annulled instructions, e.g., instruction A+3. The first annulled instructions may be written to the reload register address 101 as instruction A+1. After returning from or completing the interrupt sub-routine, the processor may resume processing and executing the annulled instructions in the next available slot in the processor pipeline.

In this case, an interrupt penalty is incurred for repeating the operations which were already executed on annulled instruction A+3 prior to the interrupt (in row 6) again for the instruction. The interrupt penalty incurred in this case using embodiments of the invention is one computational cycle, reduced from two computational cycles, which was incurred for the same interruption when instruction A+2, not A+3, is a branch instruction, e g , as described in reference to FIG. 3. According to embodiments of the invention, when an instruction is determined to be a branch instruction, the branch instruction itself and any instructions in pipeline slots between the branch instruction slot and the interrupt slot may be annulled or "killed." In FIG. 3, there is one instruction A+3 (row 5) in between the branch instruction slot (row 4) and the interrupt slot (row 6). Accordingly, the branch instruction itself A+2 and the intervening instruction A+3 are both annulled providing a total penalty of two instructions or computational cycles. In FIG. 4, there are no intervening slots between the branch instruction A+3 (row 5) and the interrupt (row 6), so only the branch instruction A+3 is annulled providing a total penalty of one instructions or one computational cycle.

FIG. 5 shows the same interruption described in reference to FIGS. 3 and 4, except that none of the instructions, A, A+1, A+2, and A+3, are branch instructions.

A processor (e.g., processor 1 of FIGS. 1A and 1B) may decode instructions A+1, A+2, and A+3 (row 3, column 7; row 4, column 8; and row 5, column 9; respectively) and determine that none of these instructions are branch instructions. Accordingly, instructions A+1, A+2, and A+3 are allowed to proceed uninterrupted until the instructions are completely processed (e.g., in stage E4: row 3 column 11; row 4, column 12; and row 5, column 13, respectively, not shown). Since none of instructions A+1, A+2, and A+3 preceding the interrupt are branch instructions, no instruction are annulled or "killed."

A return register (e.g., in register files 9 of FIG. 1B) may be loaded with the address of the next instruction in the sequence of instructions, e.g., instruction A+4, which may be written to the reload register address 101 as instruction A+1 After returning from or completing the interrupt sub-routine, the processor may resume processing and executing the annulled instructions in the next available slot in the processor pipeline.

In this case, since no instructions are annulled or "killed," no interrupt penalty is incurred. The interrupt penalty in this case is zero computational cycle, reduced from one computational cycle incurred for the same interruption when instruction A+3 is a branch instruction, e g , as described in reference to FIG. 4.

When an interrupt is processed, conventional mechanisms always annul instructions for which it is not known if the instructions are branch instructions, e g., which have not yet been decoded, regardless of whether or not the instructions are actually branch instructions. In the example described in reference to FIG. 2, there are three such instructions A+1, A+2, and A+3, to provide an interrupt penalty of three computational cycles. In contrast, mechanisms described according to embodiments of the invention, annul instructions which are actually determined to be branch instructions and any instructions in pipeline slots between the branch instruction slot and the interrupt slot. In FIG. 3, one branch instructions A+2 and one instruction A+3 in an associated delay slot are interrupted providing an interrupt penalty of two computational cycles. In FIG. 4, one branch instruction A+3 is interrupted and an interrupt penalty of one computational cycle is incurred. In FIG. 5, no branch instructions are interrupted and therefore, no interrupt penalty is incurred. Accordingly, embodiments of the invention reduce the interrupt penalty associated with processing interrupt in a computing system.

Figure 6:
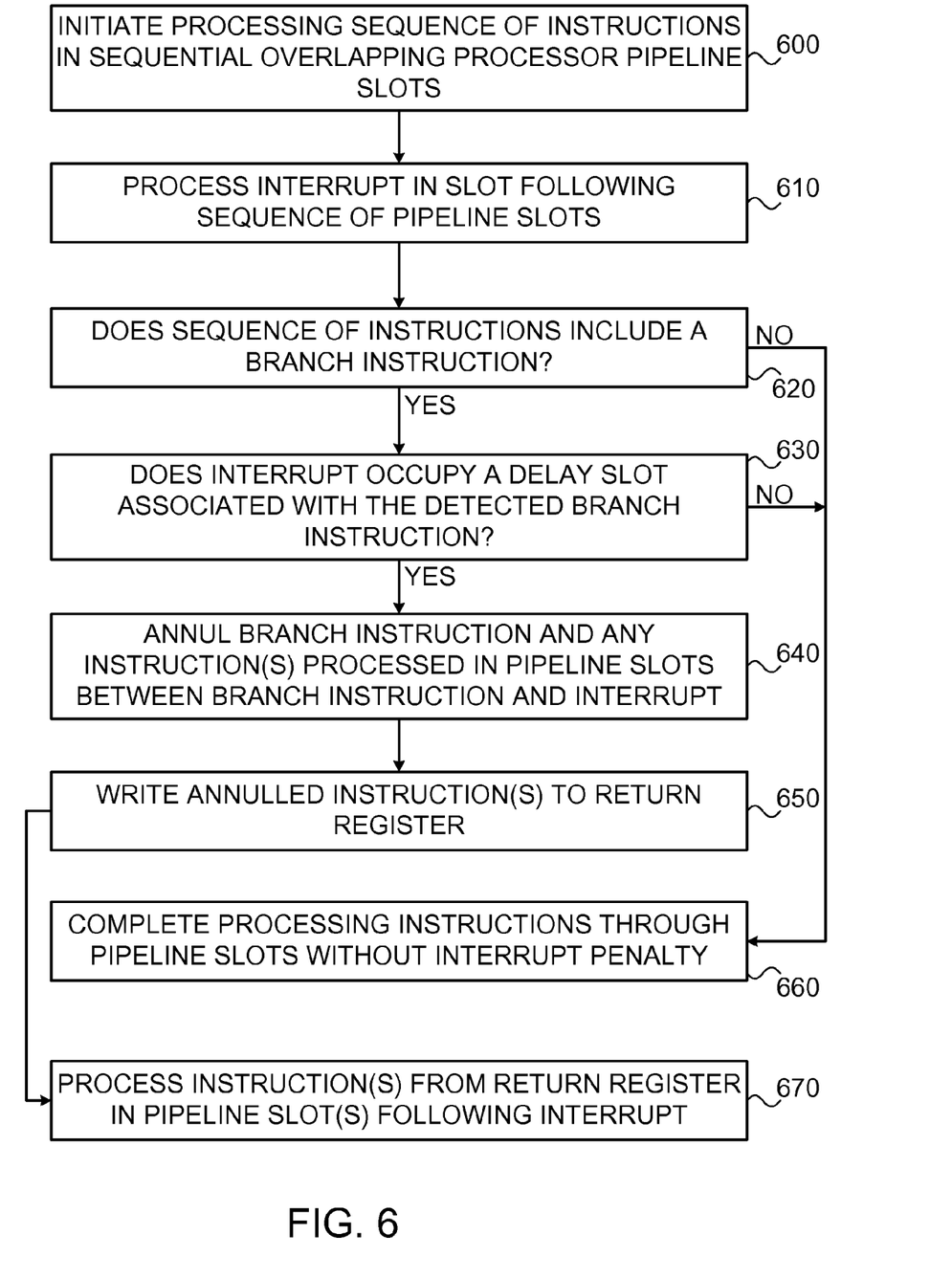
FIG. 6 is a flowchart of a method in accordance with embodiments of the invention.

Reference is made to FIG. 6, which is a flowchart of a method according to embodiments of the invention In operation 600, a processor (e.g., processor 1 of FIGS. 1A and 1B) may initiate processing a sequence of instructions, in turn, in respective processor pipeline slots, e.g., as described in reference to FIGS. 3-5.

In operation 610, the processor may initiate processing an interrupt in a processor pipeline slot following the sequence of slots used to process instructions in operation 600.

In operation 620, once the interrupt process or sub-routine is initiated, each sequential instruction of operation 600 is processed until one of the instructions is determined to be a branch instruction. If one of the instructions of operation 600 is a branch instruction, a process may proceed to operation 630. Otherwise, a process may proceed to operation 670. The processor may determine if an instruction is a branch instruction, e.g., when the instruction is decoded (e.g., at the D2 stage of the processor pipeline).

In operation 630, the processor may determine if the interrupt is processed in a delay slot associated with the detected branch instruction Typically, delay slots follow a branch instruction and may be necessary to properly resolve the branch, e.g., to determine which instruction(s) follow the branch instruction When the interrupt occupies one of these delay slots, the processor may not determine the instruction(s) following the branch instruction and the branch may remain unresolved. If the processor determines that the interrupt of operation 610 is processed in a delay slot associated with the branch instruction detected in operation 620, a process may proceed to instruction 640. Otherwise, a process may proceed to operation 670.

In operation 640, the processor may annul or "kill" the branch instruction detected in operation 620 and instructions processed in the pipeline slots, if any, between the pipeline slots in which the branch instruction and the interrupt are processed.

In operation 650, the processor may write the addresses of, e g , at least the first, annulled instruction(s) to a return register (e.g., in register files 9 of FIG. 1B).

In operation 660, when no branch instruction is detected or when a branch instruction is detected, but the interrupt does not occupy a delay slot associated therewith, the processor may complete processing instructions without annulment and therefore without an interrupt penalty In operation 670, after returning from the interrupt sub-routine, the processor may execute the instruction from the return register in a processor pipeline slot following the interrupt processor pipeline slot of operation 610.

Other operations or series of operations may be used.

Embodiments of the invention may include an article such as a computer or processor readable medium, or a computer or processor storage medium, such as for example a memory, a disk drive, or a USB flash memory, encoding, including or storing instructions which when executed by a processor or controller (e g , processor 1 of device 100 in FIGS. 1A and 1B), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method for digital signal processing, the method comprising:
    initiating processing a sequence of instructions followed by an interrupt, the instructions are to be processed in a sequence of pipeline slots and the interrupt is to be processed in a slot following the sequence of pipeline slots;
    at a decode stage, detecting if an instruction in the sequence of instructions is a branch instruction;
    if the sequence of instructions does not include a branch instruction, complete processing the sequence without interrupt penalty; and
    if a branch instruction is detected and the interrupt occupies a delay slot associated with the detected branch instruction, annulling the detected branch instruction and any instruction in the sequence between the branch instruction and an interrupt address instruction associated with the interrupt and complete processing any instruction in the sequence that precedes the detected branch instruction.

2. The method of claim 1, wherein the delay slots are needed to properly process a branch instruction.

3. The method of claim 1, comprising processing annulled instructions in respective pipeline slots following the interrupt sub-routine.

4. The method of claim 1, comprising writing annulled instructions to a return register and queuing the annulled instructions to be processed in sequential order in pipeline slots following the interrupt sub-routine.

5. The method of claim 1, comprising incurring an interrupt penalty for re-processing each annulled instruction.

6. The method of claim 1, comprising continuing processing the sequential instructions at least until one of the instructions is determined to be a branch instruction.

7. The method of claim 1, comprising processing instructions uninterrupted through the entire pipeline process for each instruction which precedes the interrupt, is not a branch instruction and does not occupy a delay slot associated with a branch instruction.

8. A processor for digital signal processing, the processor comprising:
    a branch detector, wherein the processor initiates processing a sequence of instructions followed by an interrupt, each instruction processed in respective sequential pipeline slots, wherein the branch detector detects if an instruction is a branch instruction and if a branch instruction is detected and the interrupt occupies a delay slot associated with the detected branch instruction, the processor annuls the branch instruction and any instruction in the sequence between the branch instruction and an interrupt address instruction associated with the interrupt and complete processing any instruction in the sequence that precedes the detected branch instruction, and if a branch instruction is not detected the processor completes processing the sequence of instructions without interrupt penalty.

9. The processor of claim 8, wherein the processor processes annulled instructions in respective pipeline slots following the interrupt pipeline slot.

10. The processor of claim 8, comprising a return register, wherein annulled instructions are written to the return register where they are queued to be processed by the processor in sequential order in pipeline slots following the interrupt sub-routine.

11. The processor of claim 8, wherein an interrupt penalty is incurred to re-process each annulled instruction in a pipeline slot following the interrupt pipeline slot.

12. The processor of claim 8, wherein the processor continues to process the sequential instructions at least until the branch detector detects a branch instruction.

13. The processor of claim 8, wherein when the processor determines that an instruction preceding the interrupt is not a branch instruction and does not occupy a delay slot associated with a branch instruction, the processor processes the instruction uninterrupted through the entire pipeline process.

14. A system for digital signal processing, the system comprising:
    a processor to initiate processing a sequence of instructions followed by an interrupt, each instruction processed in respective sequential pipeline slots;
    a branch detector for detecting if an instruction is a branch instruction,
    wherein if a branch instruction is detected and the interrupt occupies a delay slot associated with the detected branch instruction, the processor annuls the branch instruction the branch instruction and any instruction in the sequence between the branch instruction and an interrupt address instruction associated with the interrupt and complete processing any instruction in the sequence that precedes the detected branch instruction and a branch instruction is not detected the processor completes processing the sequence of instructions without interrupt penalty; and
    an execution unit to execute at least the sequence of instructions to run a program.

15. The system of claim 14, wherein the processor processes annulled instructions in respective pipeline slots following the interrupt sub-routine.

16. The system of claim 14, wherein the processor continues to process the sequential instructions at least until the branch detector detects a branch instruction.

17. The system of claim 14, wherein when the processor determines that an instruction preceding the interrupt is not a branch instruction and does not occupy a delay slot associated with a branch instruction, the processor processes the instruction uninterrupted through the entire pipeline process.

* * * * *